US012806517B2

(12) United States Patent
Ikenaga

(10) Patent No.: US 12,806,517 B2
(45) Date of Patent: *Nov. 24, 2026

(54) INFORMATION PROCESSING SYSTEM, INFORMATION PROCESSING METHOD, INFORMATION STORAGE MEDIUM, AND PROGRAM

(71) Applicant: Sony Interactive Entertainment Inc., Tokyo (JP)

(72) Inventor: Toshiya Ikenaga, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/054,209

(22) Filed: Feb. 14, 2025

(65) Prior Publication Data

US 2025/0186882 A1 Jun. 12, 2025

Related U.S. Application Data

(63) Continuation of application No. 18/593,109, filed on Mar. 1, 2024, now Pat. No. 12,251,630, which is a continuation of application No. 17/692,449, filed on Mar. 11, 2022, now Pat. No. 11,944,901, which is a continuation of application No. 16/816,656, filed on Mar. 12, 2020, now Pat. No. 11,298,615, which is a continuation of application No. 15/139,506, filed on Apr. 27, 2016, now Pat. No. 10,625,155, which is a continuation of application No. 13/822,182, filed as (Continued)

(51) Int. Cl.

*A63F 13/355* (2014.01)
*A63F 13/00* (2014.01)
*A63F 13/426* (2014.01)
*A63F 13/49* (2014.01)
*A63F 13/497* (2014.01)
*A63F 13/86* (2014.01)

(52) U.S. Cl.

CPC ............ *A63F 13/355* (2014.09); *A63F 13/00* (2013.01); *A63F 13/426* (2014.09); *A63F 13/49* (2014.09); *A63F 13/497* (2014.09); *A63F 13/86* (2014.09); *A63F 2300/636* (2013.01)

(58) Field of Classification Search

None

See application file for complete search history.

(56) References Cited

U.S. PATENT DOCUMENTS 8,625,754 B1 * 1/2014 Croak ................ H04N 21/4782 715/205
9,352,215 B2 * 5/2016 Ikenaga ................ A63F 13/355

(Continued)

*Primary Examiner* — Ricky Chin
(74) *Attorney, Agent, or Firm* — Kilpatrick Townsend & Stockton LLP

(57) ABSTRACT

Technique are provided for launching a video game application from a play point in a video. A method can include causing display of a video of game play of a video game application, the video displaying a plurality of play points of the video game application. The method can further include transmitting a request for execution of the video game application at a play point of the plurality of play points of the video game application. The method can further include receiving the video game application based on transmitting the request for execution. The method can further include causing execution of the video game application, the video game launching based on the play point.

20 Claims, 4 Drawing Sheets

| VIDEO ID | GAME ID | ELAPSED TIME DATA | SNAPSHOT DATA |
|---|---|---|---|
| 0001 | 001 | 00:00:00 | .... |
| 0001 | 001 | 00:00:05 | .... |
| 0001 | 001 | 00:00:10 | .... |
| 0001 | 001 | 00:00:15 | .... |
| | | | |

58

Related U.S. Application Data application No. PCT/JP2011/068366 on Aug. 11, 2011, now Pat. No. 9,352,215.

(56) References Cited

U.S. PATENT DOCUMENTS

| | | | | |
|---|---|---|---|---|
| 10,625,155 | B2 * | 4/2020 | Ikenaga | A63F 13/426 |
| 11,298,615 | B2 * | 4/2022 | Ikenaga | A63F 13/48 |
| 11,944,901 | B2 * | 4/2024 | Ikenaga | A63F 13/48 |
| 12,251,630 | B2 * | 3/2025 | Ikenaga | A63F 13/86 |
| 2009/0011838 | A1 * | 1/2009 | Miyamoto | A63F 13/493<br>463/43 |
| 2009/0094600 | A1 * | 4/2009 | Sargaison | A63F 13/69<br>717/176 |

* cited by examiner

| VIDEO ID | GAME ID | ELAPSED TIME DATA | SNAPSHOT DATA |
|---|---|---|---|
| 0001 | 001 | 00:00:00 | .... |
| 0001 | 001 | 00:00:05 | .... |
| 0001 | 001 | 00:00:10 | .... |
| 0001 | 001 | 00:00:15 | .... |
| | | | |

58

INFORMATION PROCESSING SYSTEM, INFORMATION PROCESSING METHOD, INFORMATION STORAGE MEDIUM, AND PROGRAM

CROSS REFERENCE TO RELATED APPLICATIONS

This is a continuation application of U.S. patent application Ser. No. 18/593,109, accorded a filing date of Mar. 1, 2024 (allowed); which is a continuation application of U.S. patent application Ser. No. 17/692,449, accorded a filing date of Mar. 11, 2022 (U.S. Pat. No. 11,944,901, issued Apr. 2, 2024); which is a continuation application of U.S. patent application Ser. No. 16/816,656, accorded a filing date of Mar. 12, 2020 (U.S. Pat. No. 11,298,615, issued Apr. 12, 2022); which is a continuation application of U.S. patent application Ser. No. 15/139,506, accorded a filing date of Apr. 27, 2016 (U.S. Pat. No. 10,625,155, issued Apr. 21, 2020); which is a continuation application of U.S. patent application Ser. No. 13/822,182, accorded a filing date of Mar. 11, 2013 (U.S. Pat. No. 9,352,215, issued May 31, 2016); which is a national stage application of International Application No. PCT/JP2011/068366, filed Aug. 11, 2011; and which claims priority to JP Application No. 2010-212845, filed Sep. 22, 2010, the entire disclosures of which are hereby incorporated by reference.

TECHNICAL FIELD

The present invention relates to an information processing system, an information processing method, an information storage medium, and a program.

BACKGROUND ART

There are video distribution sites which distribute videos registered by users (see Patent Literature 1, for example). In some video distribution sites, many videos that show television (TV) game contents played by users are registered.

A user who finds it hard to clear a TV game may find a hint to clear the game by viewing videos registered in video distribution sites that show how other users played the game. There are also cases where a user becomes interested in a game that is shown on a video registered in a video distribution site and purchases the game.

CITATION LIST—PATENT LITERATURE

[Patent Literature 1] US 2008/0276272 A1

SUMMARY OF INVENTION TECHNICAL PROBLEM

Viewing videos registered in video distribution sites that show contents of a game played by other users may make a user want to try the game. If in that case there is a mechanism that enables the user to, for example, specify a play point in the video that the user is viewing and to start playing the game from a game situation corresponding to the play point, the user would enjoy the game more. This applies not only to videos registered in video distribution sites but to any videos that show TV game contents played by users.

The present invention has been made in view of the problem described above, and an object of the present invention is therefore to provide an information processing system, an information processing method, an information storage medium, and a program that enable a user to start playing a game from a game situation corresponding to a play point in a video that shows a play content of the game.

Solution to Problem

In order to solve the above-mentioned problem, according to the present invention, there is provided an information processing system, including: an execution request receiving unit that receives an execution request for a game which is associated with a play point in a video that shows a play content of the game; a game situation data obtaining unit that obtains, from a storage unit that stores pieces of game situation data which indicate situations of the game that are associated with play points in the video, a game situation data that is identified based on a play point associated with the execution request; and a game executing unit that starts executing the game from a situation that is indicated by the game situation data obtained by the game situation data obtaining unit.

Further, according to the present invention, there is provided an information processing method, including: an execution request receiving step of receiving an execution request for a game which is associated with a play point in a video that shows a play content of the game; a game situation data obtaining step of obtaining, from a storage unit that stores pieces of game situation data which indicate situations of the game that are associated with play points in the video, game situation data corresponding to a play point associated with the execution request; and a game executing step of starting executing the game from a situation that is indicated by the game situation data obtained in the game situation data obtaining step.

Further, according to the present invention, there is provided a computer-readable information storage medium having stored thereon a program for causing a computer to function as: an execution request receiving unit that receives an execution request for a game which is associated with a play point in a video that shows a play content of the game; a game situation data obtaining unit that obtains, from a storage unit that stores pieces of game situation data which indicate situations of the game that are associated with play points in the video, game situation data corresponding to a play point associated with the execution request; and a game executing unit that starts executing the game from a situation that is indicated by the game situation data obtained by the game situation data obtaining unit.

Further, according to the present invention, there is provided a program for causing a computer to function as: an execution request receiving unit that receives an execution request for a game which is associated with a play point in a video that shows a play content of the game; a game situation data obtaining unit that obtains, from a storage unit that stores pieces of game situation data which indicate situations of the game that are associated with play points in the video, game situation data corresponding to a play point associated with the execution request; and a game executing unit that starts executing the game from a situation that is indicated by the game situation data obtained by the game situation data obtaining unit.

According to the present invention, the execution of the game is started from the situation that is indicated by the game situation data identified based on the play point in the video that is associated with the execution request for the game. A user can thus start playing the game from the game situation corresponding to the play point in the video that shows the play content of the game.

According to an aspect of the present invention, during a period of time in which a video showing an already played content of a game is being played, the execution request receiving unit receives an execution request for the game that is associated with a play point in the video. This way, the user can start playing the game from the game situation corresponding to the play point in the video that shows the already played content of the game.

Further, according to an aspect of the present invention, the game situation data obtaining unit obtains game situation data that is identified based on a play point in the video of a frame image that has been played at a time when the execution request for the game has been made. This way, the user can start playing the game from a game situation corresponding to a scene that has been played at the time when the execution request for the game has been made.

In this aspect, the game situation data obtaining unit may obtain game situation data associated with a play point that is closest to the play point in the video of the frame image that has been played at the time when the execution request for the game has been made, out of at least some of the pieces of game situation data stored in the storage unit. This way, the user can start playing the game from a situation that is closest to the situation of a scene that has been played at the time when the execution request for the game has been made, out of game situations that are indicated respectively by the at least some of pieces of game situation data stored in the storage unit.

Further, in this aspect, the game situation data obtaining unit may obtain, out of the pieces of game situation data stored in the storage unit, a piece of game situation data that is associated with a play point indicating a time that precedes a time indicated by the play point in the video of the frame image that has been played at the time when the execution request for the game has been made. This way, the user can start playing the game from a situation that is closest to the situation of a scene that has been played at the time when the execution request for the game has been made, out of game situations preceding the scene that has been played at the time when the execution request for the game has been made.

Further, according to an aspect of the present invention, the game situation data obtaining unit obtains, out of the pieces of game situation data stored in the storage unit, game situation data that is associated with a play point indicating a time closest to a time obtained by going back a given length of time from a time indicated by the play point of the frame image included in the video that has been played at the time when the execution request for the game has been made. This way, the user can start playing the game from a situation that is closest to the game situation of a scene reached by going back the given length of time from the scene that has been played at the time when the execution request for the game has been made.

Further, according to an aspect of the present invention, the storage unit includes pieces of game situation data at times when game stages corresponding to stages of progress of the game are started, and the game situation data obtaining unit obtains game situation data at a start of one of the game stages that corresponds to the play point associated with the execution request. This way, the user can start playing the game from the beginning of the game stage corresponding to the play point that is associated with the execution request for the game.

Further, according to an aspect of the present invention, the information processing system further includes a game situation data generating unit that generates the game situation data which indicates a current situation of the game that is being executed during a period of time in which the game is being executed. This way, the game situation data indicating the current situation of the game that is being executed is generated.

DESCRIPTION OF EMBODIMENT

Figure 1:
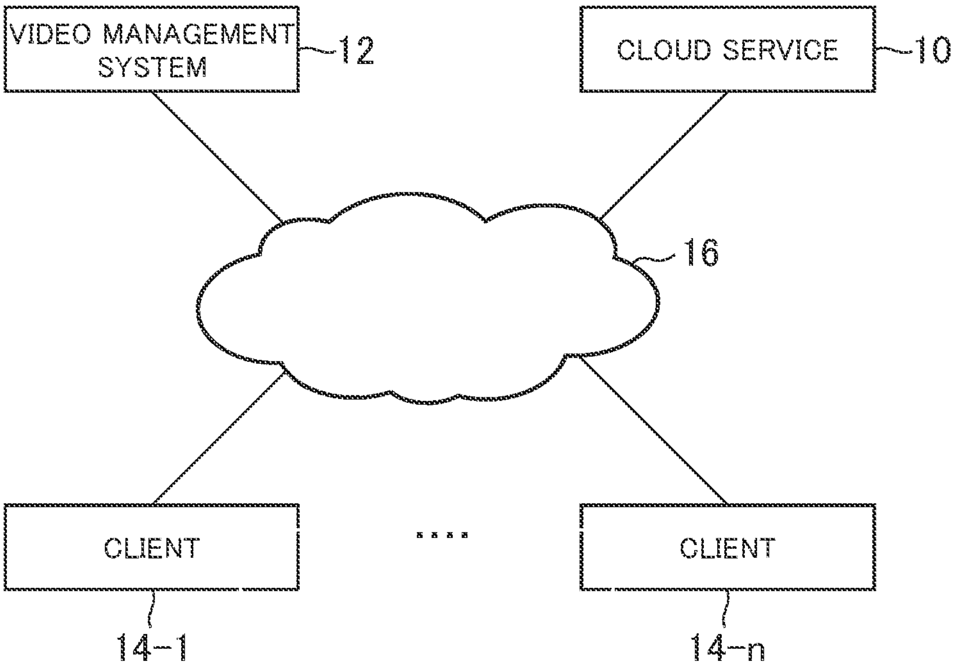
FIG. 1 A diagram illustrating an example of the overall configuration of a computer network according to an embodiment of the present invention.

An embodiment of the present invention is hereinafter described in detail referring to the drawings.

FIG. 1 is a diagram illustrating an example of the overall configuration of a computer network according to the embodiment of the present invention. As illustrated in FIG. 1, a cloud service 10, a video management system 12, and clients 14 (14-1 to 14-*n*), which are all constructed based on computers, are connected to the computer network such as the Internet, which is denoted by 16. The cloud service 10, the video management system 12, and the clients 14 can communicate to/from one another.

Each of the clients 14 is a computer utilized by a user of the cloud service 10 or the video management system 12, and is, for example, a personal computer, a game console, a television set, a portable game device, or a portable information terminal. The client 14 includes, for example, a control device such as a CPU, a memory device such as a storage element including a ROM or a RAM, or a hard disk drive, an output device such as a display or a speaker, an input device such as a game controller, a touch pad, a mouse, a keyboard, or a microphone, a communication device such as a network board, and an optical disc drive that reads data from an optical disc (computer-readable information storage medium) such as a digital versatile disc (DVD)-ROM or Blu-ray (trademark) disc.

The clients 14 according to this embodiment each have plug-in programs for a Web browser and for the cloud service 10 which are pre-installed therein, and execute these application programs. The clients 14 receive various services provided by the cloud service 10 and the video management system 12 via the Web browser. Details of the plug-in program for the cloud service are described later.

The video management system 12 is, for example, a computer system that handles the registration of videos received from the clients 14 and the cloud service 10 and the distribution of videos to the clients 14 in response to requests from the clients 14.

The cloud service 10 is, for example, a distributed computing environment that functions as an information processing system according to an embodiment of the present invention, and includes, among others, a plurality of Web application servers, a plurality of database servers, and a plurality of storage devices which are connected in a manner that allows communication to/from one another. The servers included in the cloud service 10 each include, for example, a control unit such as a CPU, a storage unit which is a ROM, a RAM, or other types of storage element, or a hard disk drive, and a communication unit which is a communication interface such as a network board. Those components are connected via a bus.

The clients 14 using the cloud service 10 can use various services provided by the cloud service 10 without being particularly conscious of the locations of servers, storage devices, and other resources in the cloud service 10.

According to this embodiment, the clients 14 each access the cloud service 10 through the web browser, and input a user ID and a password. Then, under the condition that the client 14 accesses a predetermined URL, a screen corresponding to the predetermined URL is displayed on the display of the client 14. After the entry of the user ID and the password, the cloud service 10 can identify the user ID of the user who utilizes the client 14 by, for example, referring to a cookie.

In this embodiment, under the condition that a user (a user A) transmits, for example, a request to start a shooting game to the cloud service 10 from one of the clients 14, the cloud service 10 starts executing the game. While the game is being executed, the cloud service 10 sequentially distributes, by streaming, frame images showing a play content of the game to the client 14 of the user A. The frame images are sequentially displayed on the display of the client 14 of the user A via the browser. A video constituted of a group of frame images that are sequentially distributed by streaming in this manner is hereinafter referred to as live video. The user A can enjoy the game by pressing a button on the game controller or otherwise operating the game controller while viewing the live video.

Figure 2:
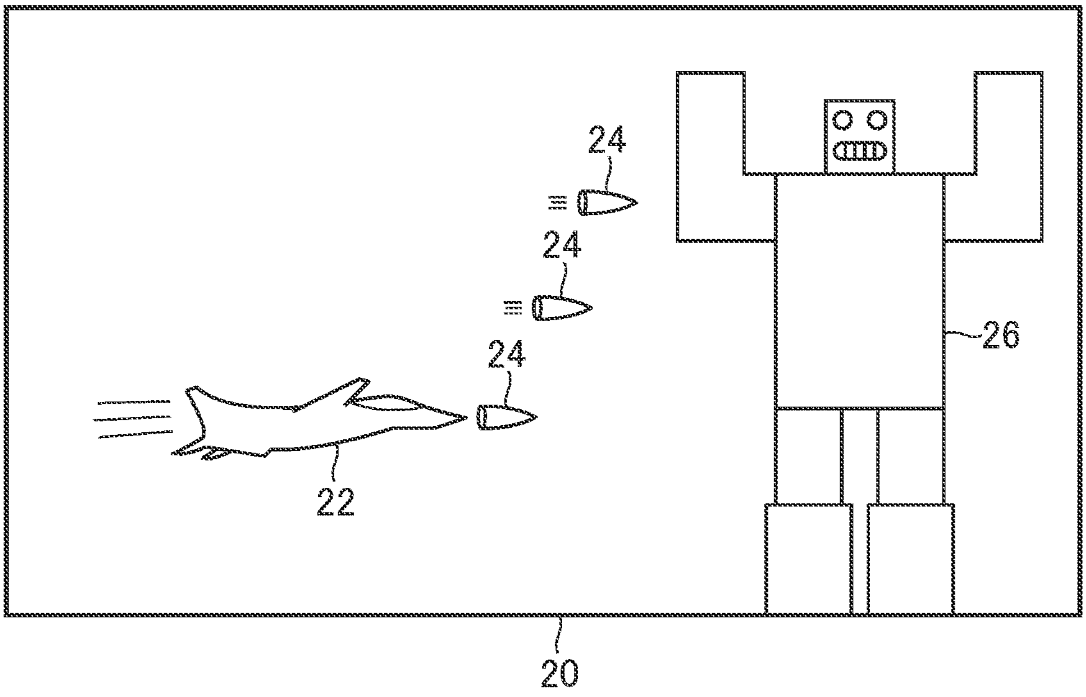
FIG. 2 A diagram illustrating an example of a game screen.

FIG. 2 illustrates an example of a game screen 20 which is displayed on the display of the client 14 of the user A. The game screen 20 displays the live video described above. The game screen 20 in this embodiment includes a player object 22, which represents a fighter plane or the like operated by the player in the shooting game, a missile object 24 which represents a missile launched from the player object 22, and an adversary object 26, which represents an adversary to be defeated by the player object 22. The user A makes key inputs such as pressing a button on the game controller, to thereby perform an operation in the shooting game such as moving the player object 22 or launching the missile object 24. The user A defeats the adversary object 26 by launching the missile object 24 aimed at the adversary object 26 while dodging the pursuing adversary object 26.

In this embodiment, the shooting game described above includes a plurality of game stages corresponding to stages of the progress of the game. Under the condition that an event such as the user A clearing one of the game stages or a "game over" occurs, the cloud service 10 registers in the video management system 12 a video that shows a play content of the game from the time when the game stage has started to the time when the event has occurred (this video is hereinafter referred to as replay video). A replay video showing an already played content of the shooting game that is played by the user A is thus registered in the video management system 12 in this embodiment. Under the condition that another user (a user B) subsequently transmits a request to play this replay video from one of the clients 14 to the video management system 12, the video management system 12 distributes by streaming the replay video to the client 14 of the user B.

Figure 3:
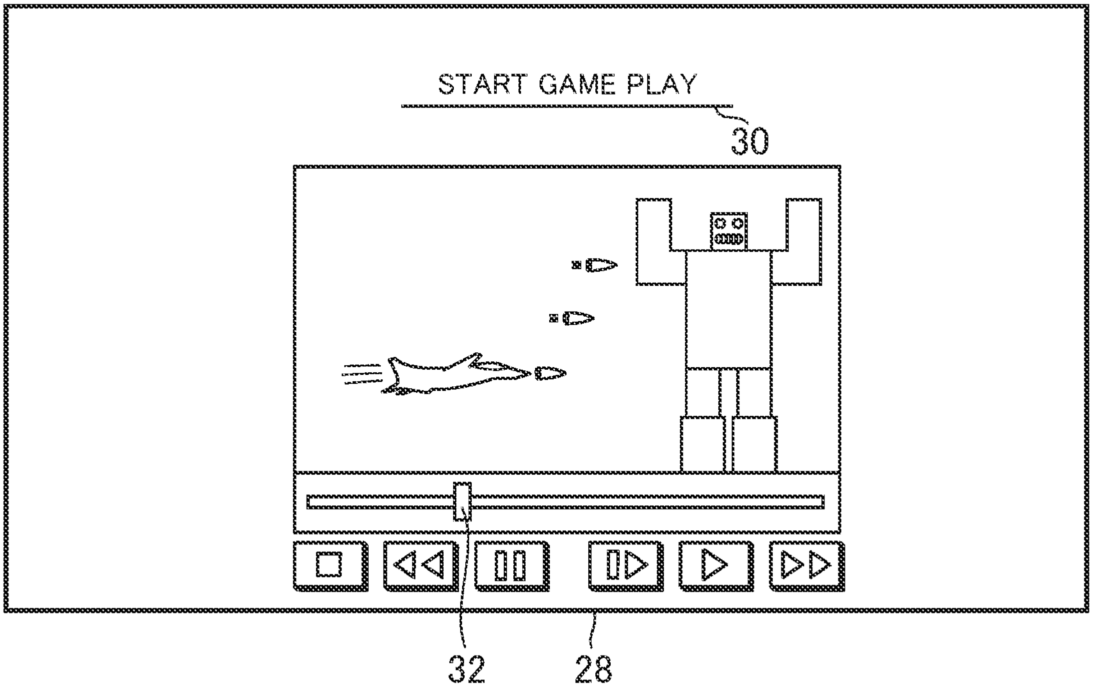
FIG. 3 A diagram illustrating an example of a replay video display screen.

FIG. 3 illustrates an example of a replay video display screen 28 which is displayed on the display of the client 14 of the user B. The replay video display screen 28 displays the replay video described above. The replay video display screen 28 also includes a return link 30 for requesting a return to a situation corresponding to a play point in the replay video (to start the execution of the game from a situation corresponding to a play point in the replay video). Various buttons for controlling video play and a knob 32 which travels from the left to the right with the progress of video play are arranged on the replay video display screen 28. Under the condition that the user B clicks on the return link 30 while the replay video is being played, the client 14 transmits to the cloud service 10 a request to start the execution of the game from a situation corresponding to this play point. The cloud service 10 starts the execution of the game from the situation in response. While this game is being executed, the cloud service 10 distributes by streaming a live video that shows the play content of this game to the client 14 of the user B. The client 14 of the user B displays the game screen 20 similar to the one in FIG. 2. The user B can then enjoy the game started from a situation that corresponds to the play point specified by the user B.

Figure 4:
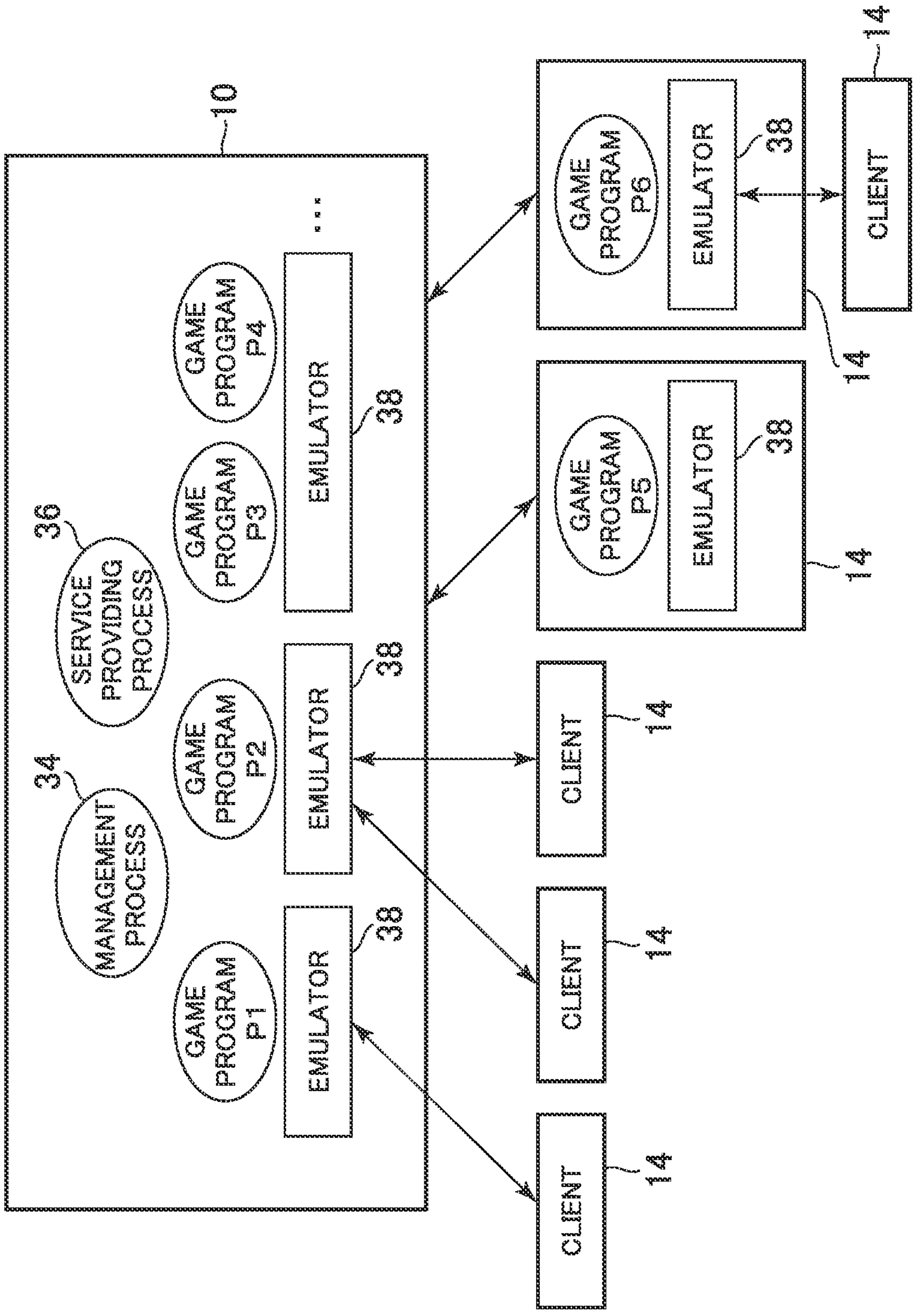
FIG. 4 A conceptual diagram illustrating an example of the relation between a cloud service and clients according to the embodiment.

FIG. 4 is a conceptual diagram illustrating an example of the relation between the cloud service 10 and the clients 14 according to this embodiment. The cloud service 10 according to this embodiment executes, for example, a management process 34, a service providing process 36, and emulators 38. Image files of various game programs are stored in advance in storage devices and other memory devices that are included in the cloud service 10. The game programs are each associated with a game ID which is the identifier of a game.

The service providing process 36 is, for example, a process that is generated by a server included in the cloud service 10 by activating a program that implements one of various services provided by the cloud service 10, such as a shopping site and a social networking service (SNS).

The management process 34 is, for example, a process that is generated by a server included in the cloud service 10 by activating a management program which is installed in servers or storage devices included in the cloud service 10. The management process 34 executes processing of managing the location of the emulator 38, processing of activating the emulator 38, processing of shutting down the emulator 38, processing of connecting one of the clients 14 to the emulator 38 in response to a request from the client 14, processing of disconnecting one of the clients 14 from the emulator 38 in response to a request from the client 14, and the like.

The emulator 38 is, for example, a process that functions as a virtual machine for executing a game program stored in a server or a storage device that is included in the cloud service 10. The emulator 38 is generated by the management process 34 by activating, in response to a request from one of the clients 14, an emulator program installed in a server or a storage device that is included in the cloud service 10. The management process 34 then reads an image file of a game program specified by the client 14 in response to a request from the client 14, and loads the image file onto the emulator 38. This causes the game program to be executed on the emulator 38. Alternatively, the emulator 38 may load a game program specified by the client 14 onto its own process.

In response to requests from the clients 14 or from the management process 34, the emulator 38 outputs, for example, an emulated memory image or register (e.g., a program counter) that is managed by the emulator 38, a log of input/output access made by a game program that runs on the emulator 38, and a log of CPU commands or GPU commands executed on the emulator 38.

This embodiment allows the exclusive use of one emulator 38 by one client 14 as illustrated in FIG. 4 (see a game program P1). This embodiment also allows a plurality of clients 14 to connect to one emulator 38 (see a game program P2). This embodiment also allows one emulator 38 to execute a plurality of game programs (see game programs P3 and P4).

In this embodiment, in the case where an emulator program is installed in each client 14 as illustrated in FIG. 4, the management process 34 outputs an instruction to activate the emulator 38 or an instruction to shut down the emulator 38 to the client 14 in response to a request from the client 14. The client 14 responds to the activation instruction received from the management process 34 by activating the emulator program that is installed in the client 14. The client 14 responds to the shutdown instruction received from the management process 34 by shutting down the emulator 38 that is being run. This embodiment is also designed so that the emulator 38 running on the client 14 can execute a game program stored in the client 14 (see a game program P5). This embodiment is also designed so that another client 14 can connect to the emulator 38 running on the client 14 (see a game program P6).

Figures 5, 6:
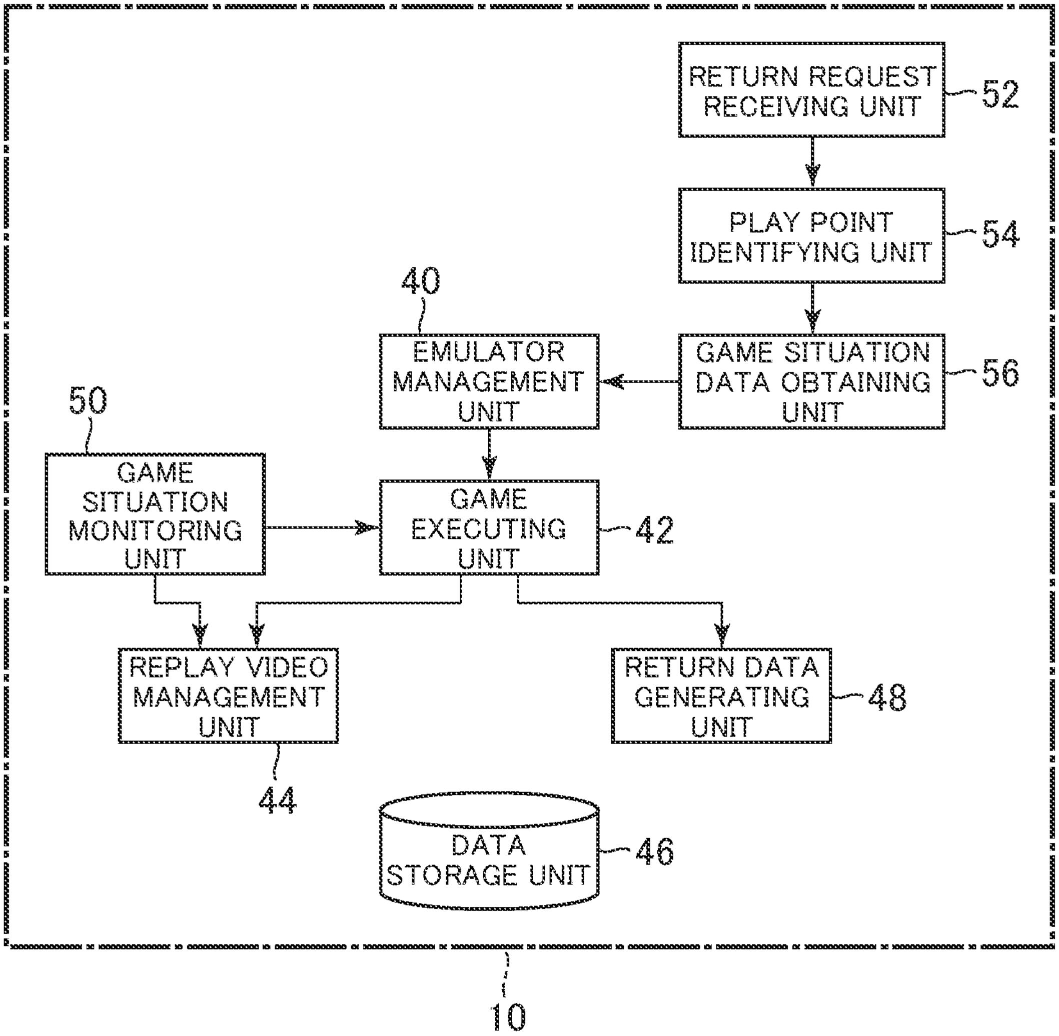
FIG. 5 A functional block diagram illustrating an example of functions that are implemented in the cloud service according to the embodiment.
FIG. 6 A diagram illustrating an example of return data.

FIG. 5 is a functional block diagram illustrating an example of functions that are implemented by the cloud service 10 according to this embodiment. FIG. 5 illustrates only functions that have particular relevance to the following description, and other functions than those of FIG. 5 are also implemented in the cloud service 10 according to this embodiment. As illustrated in FIG. 5, the cloud service 10 according to this embodiment includes, in terms of function, for example, an emulator management unit 40, a game executing unit 42, a replay video management unit 44, a data storage unit 46, a return data generating unit 48, a game situation monitoring unit 50, a return request receiving unit 52, a play point identifying unit 54, and a game situation data obtaining unit 56. The data storage unit 46 is implemented mainly by, for example, a memory device such as a memory or a hard disk drive that is a component of a server included in the cloud service 10, or storage device included in the cloud service 10. The game executing unit 42 corresponds to, for example, a function implemented by the emulator 38. The rest of the components correspond to, for example, functions implemented by the management process 34.

The cloud service 10 is built with a computer as a main component as described above, and the respective functional components of FIG. 5 are implemented by executing a program. The program is provided to the cloud service 10 via, for example, a computer-readable information storage medium such as a CD-ROM or a DVD-ROM, or a communication network such as the Internet.

The emulator management unit 40 in this embodiment performs, for example, the activation or shutdown of the emulator 38 in response to a request from one of the clients 14. The emulator management unit 40 also executes processing of connecting one of the clients 14 to the emulator 38 in response to a request from the client 14, and processing of disconnecting one of the clients 14 from the emulator 38 in response to a request from the client 14. The emulator management unit 40 also loads an image file of a game program onto the activated emulator 38. The emulator management unit 40 further executes processing of managing the location of the emulator 38.

The game executing unit 42 in this embodiment performs, for example, the execution of a game program loaded onto the emulator 38.

In this embodiment, under the condition that the user A transmits, for example, a request to start a shooting game to the cloud service 10 from one of the clients 14, the emulator management unit 40 of the cloud service 10 activates the emulator 38 in response to the start request, and loads an image file of the shooting game onto the activated emulator 38. The game executing unit 42 then starts the loaded shooting game.

The game executing unit 42 in this embodiment executes, for every given length of game update time (e.g., 1/60 seconds) since the start of the shooting game, three processing procedures, specifically, game situation data updating processing in which game situation data indicating a game situation is updated, frame image generating processing in which a frame image showing a play content of the game is generated based on the updated game situation data, and frame image transmitting processing in which the generated frame image is transmitted to the client 14, in the stated order. In short, the game executing unit 42 repeatedly executes processing of sequentially executing the above-mentioned three processing procedures at intervals of the game update time.

In the game situation data updating processing, the game executing unit 42 in this embodiment executes, for example, processing of updating game situation data that indicates the respective positions and directions of the player object 22, the missile object 24, and the adversary object 26. The game executing unit 42 in this embodiment also executes, in the game situation data updating processing, processing of a collision detection between updated objects, game stage clear determining processing based on the result of the processing of the collision detection, miss determining processing, and the like.

In the frame image generating processing, the game executing unit 42 in this embodiment executes, for example, processing of generating frame images based on game situation data that indicates the updated positions and directions of a group of the objects. In the frame image transmitting processing, the game executing unit 42 in this embodiment transmits to the client 14 generated frame images in association with, for example, frame IDs which are frame image identifiers organized in the order of time of generation.

In this embodiment, the client 14 receives frame images transmitted sequentially from the cloud service 10. The client 14 outputs the game screen 20 that includes the received frame images to be displayed on the display. In this embodiment, the client 14 outputs for display the frame images in the order of their associated frame IDs. The frame images output to be displayed are updated sequentially. A live video is thus distributed by streaming from the cloud service 10 to the client 14.

In this embodiment, under the condition that the client 14 receives a key input made by the user such as the press of a button while the game is being executed, key information corresponding to the input (e.g., a signal indicating the type of the pressed button) is transmitted to the cloud service 10. The game executing unit 42 of the cloud service 10 executes an update of game situation data that is associated with the key information (e.g., to move the play object 22 in a direction indicated by the pressed button or to launch the missile object 24 from the player object 22).

The replay video management unit 44 in this embodiment outputs, for example, frame images generated by the game executing unit 42 to the data storage unit 46 in association with frame IDs which are frame image identifiers organized in the order of the time of generation.

The return data generating unit 48 in this embodiment generates, for example, at given return data generation intervals (e.g., five-second intervals) return data 58 which is used to return to a situation corresponding to a play point in a replay video (to start the execution of the game from a situation corresponding to a play point in a replay video), and outputs the return data 58 to the data storage unit 46 (see FIG. 6). FIG. 6 is a diagram illustrating an example of the return data 58. Under the condition that a game stage is started, the return data generating unit 48 in this embodiment generates the return data 58 of the start time of the game stage and outputs the return data 58 to the data storage unit 46. The return data 58 at the time when the game stage is started is therefore stored in the data storage unit 46. As illustrated in FIG. 6, the return data 58 includes, for example, a video ID which is the identifier of the replay video described above, a game ID which is the identifier of a game that is being played, elapsed time data which indicates the time elapsed since the start of the game stage, and game situation data which represents a game situation at that time (FIG. 6 illustrates, as an example of game situation data in this embodiment, snapshot data at the time corresponding to the elapsed time data which indicates memory image details or register values managed by the emulator 38 that is executing the shooting game). The elapsed time data included in the return data 58 associates the return data 58 with a frame image included in the replay video.

When a time to generate return data arrives, the return data generating unit 48 in this embodiment obtains memory image details or a register value that is found at that point in the emulator 38. The return data generating unit 48 then generates the return data 58 that includes a video ID which is the identifier of the replay video, a game ID which is the identifier of the game that is being played, elapsed time data which indicates the length of time from the start of the game stage to the time of the generation of the return data, and snapshot data that corresponds to the obtained memory image details or register value.

In this embodiment, the distribution by streaming of a live video to the client 14 by the game executing unit 42 is thus accompanied concurrently by the output of frame images to the data storage unit 46 by the replay video management unit 44 and the generation and output of the return data 58 by the return data generating unit 48. This embodiment also involves sequentially generating pieces of snapshot data that indicate the current situation of a game that is being executed while the game is being executed.

The game situation monitoring unit 50 monitors, for example, the progress of game processing of the shooting game that is being executed by the game executing unit 42. The data storage unit 46 in this embodiment stores, in advance, frame images that are displayed at the time when the respective game stages end, and a frame image that is displayed upon game over. Those frame images are hereinafter referred to as judging images. The game situation monitoring unit 50 in this embodiment monitors, for example, frame images generated by the game executing unit 42. The game situation monitoring unit 50 determines that a game stage has ended or that a game over has occurred under the condition that it is confirmed with the use of a known image processing technology that a monitored frame image matches one of judging images that are stored in the data storage unit 46. The time when a game stage ends or the time when a game over occurs can thus be detected in this embodiment.

Under the condition that a game stage ends or a game over occurs, the game situation monitoring unit 50 in this embodiment notifies the replay video management unit 44 of that effect. Under the condition that receiving the notification, the replay video management unit 44 generates a replay video that includes one or more frame images that have been output to the data storage unit 46 from the time when the game stage has started to the time when the above-mentioned notification has been received, and the video ID described above. The frame images included in the replay video are associated with frame IDs.

The replay video management unit 44 then transmits the replay video to the video management system 12. The video management system 12 receives the replay video and outputs the replay video to a hard disk drive or other types of memory device included in the video management system 12. The replay video is registered in the video management system 12 in this manner.

Under the condition that a letter string that is a search condition is received from the client 14 of the user B, the video management system 12 in this embodiment generates a list screen (not shown) of the outlines of replay videos that satisfy the search condition, and transmits the list screen to the client 14 of the user B. When receiving the list screen, the client 14 of the user B outputs the list screen to be displayed on the display. The user B clicks on a part of the list screen that shows one of the replay video outlines described above, causing the client 14 of the user B to transmit a request to play this replay video to the video management system 12. The video management system 12 receives the play request. The video management system 12 responds to the play request by generating the replay video display screen 28 that corresponds to the requested replay video, transmitting the replay video display screen 28 to the client 14 of the user B, and starting the distribution by streaming of the replay video.

In this embodiment, the client 14 of the user B receives the replay video display screen 28 from the video management system 12, and the plug-in program for the cloud service 10 that is installed in the client 14 of the user B transmits the video ID of the received replay video to the cloud service 10 to make an inquiry about whether or not there is the return data 58 that corresponds to the received replay video. Under the condition that the plug-in program receives from the cloud service 10 a reply to the effect that this return data 58 exists, the plug-in program embeds the return link 30 in the replay video display screen 28 as illustrated in FIG. 3.

The user B clicks on one of “play”, “slow play”, “fast-forward”, “rewind”, “pause”, and other buttons that are arranged on the replay video display screen 28 to control video play, thereby causing the client 14 to transmit a corresponding signal to the video management system 12. The video management system 12 receives this signal and performs video play control that is determined by the signal. Under the condition that the user B executes an operation of moving the knob 32 with the use of a mouse or the like, the client 14 transmits a signal that indicates a play point corresponding to the moved knob position to the video management system 12. The video management system 12 starts playing the replay video from the play point indicated by this signal.

In the case where the user B clicks on the return link 30 while the replay video is being played, the client 14 transmits to the cloud service 10 a game return request which is a request to return to a situation corresponding to a frame image that has been displayed at the time when the replay video has been played (i.e., a request to start executing the game from a situation corresponding to the frame image). The return request is associated with a combination of the video ID of the replay video being played and the frame ID of the frame image. The game return request is received by the return request receiving unit 52 of the cloud service 10.

The play point identifying unit 54 identifies a play point at which the replay video has been played at the time of the click of the return link 30 (e.g., an elapsed time or the frame count from the start of the game stage), based on the received video ID and frame ID. The play point identifying unit 54 then identifies the game that is being played based on the video ID that is associated with this game return request. The play point identifying unit 54 also identifies snapshot data that is associated with elapsed time data. The elapsed time data indicates a time period from the start of the game stage to a time when a frame image having the frame ID that is associated with the game return request received by the return request receiving unit 52 has been played (hereinafter referred to as elapsed-time-upon-return), or a time period that is shorter than the elapsed-time-upon-return and that is closest to the elapsed-time-upon-return.

The game situation data obtaining unit 56 in this embodiment obtains, for example, the snapshot data identified by the play point identifying unit 54. The emulator management unit 40 then activates a new emulator 38, and executes processing of connecting the client 14 of the user B to this emulator 38. The emulator management unit 40 loads an image file of the game identified by the play point identifying unit 54 onto this emulator 38. The game executing unit 42 starts the execution of the shooting game from a situation indicated by the snapshot data. To give a concrete example, the game executing unit 42 sets memory image details or register values managed by the emulator 38 that is executing the shooting game in a manner that reflects the snapshot data obtained by the game situation data obtaining unit 56, and then starts the execution of the shooting game described above. The user B can thus enjoy the shooting game started from a situation that corresponds to a play point at which the replay video has been played at the time of the click of the return link 30 on the client 14 of the user B.

The present invention is not limited to the embodiment described above. For instance, the game situation data obtaining unit 56 may obtain snapshot data associated with elapsed time data that indicates a time closest to a time that is reached by going back a given length of time (e.g., one minute) from the elapsed-time-upon-return. This way, the game can be started from, for example, the situation of a time that is reached by going back a little from the time when the return link 30 has been clicked.

To give another example, upon reception of a game return request, the return request receiving unit 52 may output a selection screen (not shown) which prompts the user to select starting the game from the beginning of a game stage or starting the game from a scene near one shown by a frame image that has been played at the time when the game return request has been received. In the case where the client 14 transmits the latter option to the cloud service 10, the play point identifying unit 54 may identify snapshot data associated with elapsed time data that indicates a time equal to or shorter than the elapsed-time-upon-return and closest to the elapsed-time-upon-return. In the case where the client 14 transmits the former option to the cloud service 10, the play point identifying unit 54 may identify snapshot data of the start time of a game stage that is associated with the game return request.

To give still another example, the play point identifying unit 54 may identify snapshot data associated with elapsed time data that indicates an elapsed time closest to the elapsed-time-upon-return, irrespective of whether the elapsed time precedes or follows a time indicated by a frame image having a frame ID that is associated with the received game return request.

To give yet still another example, after responding to the received game return request by identifying a game that is being played and snapshot data, the cloud service 10 may transmit to the client 14 an instruction to activate the emulator 38 that is associated with the game ID and snapshot data of the game. When receiving the activation instruction, the client 14 may activate the emulator 38. The client 14 may load, onto the emulator 38, an image file of a game program associated with the received game ID which are stored in a hard disk drive or the like of the client 14. The client 14 may set the emulator in a manner that reflects the received snapshot data, and start the emulated game. Instead of an image file stored in the hard disk drive or the like, the client 14 may read a game program stored in an optical disc from an optical disc drive to be load onto the emulator 38.

To give yet still another example, when receiving a request to distribute a live video of the user A from the client 14 of the user B, the cloud service 10 may connect the client 14 of the user B to the emulator 38 onto which a game that is being played by the user A is loaded. The cloud service 10 then may distribute to the client 14 of the user B the live video which is being distributed by streaming to the client 14 of the user A. When subsequently receiving a game return request from the client 14 of the user B, the cloud service 10 may identify the return data 58 based on a play point in the live video at that point in time. The cloud service 10 then may activate the new emulator 38 to load a game program that is associated with a game ID included in the identified return data 58. The cloud service 10 then may disconnect the client 14 of the user B from the emulator 38 onto which the game that is being played by the user A is loaded, and connect the client 14 of the user B to the new emulator 38. The game executing unit 42 may set the emulator 38 in a manner that reflects snapshot data included in the identified return data 58, and then start executing the game.

To give yet still another example, while a live video or a replay video which is distributed from the cloud service 10 is being played on one of the clients 14, the client 14 may transmit to the cloud service 10 a bookmark request associated with a combination of the video ID of the video that is being played and the frame ID of a frame image that has been displayed at the time when the video has been played. When receiving the bookmark request, the cloud service 10 may output, to the data storage unit 46, as bookmark data, the combination of the video ID and the frame ID which is associated with the received bookmark request, without stopping the distribution of the video. The cloud service 10 may transmit a list of pieces of bookmark data to the client 14 in response to a request from the client 14. The client 14 may output the bookmark data list to be displayed on the display. Under the condition that the client 14 transmits to the cloud service 10 bookmark data that is selected by the user from the list, the cloud service 10 may identify a game and snapshot data that are associated with the bookmark data, and start the execution of the shooting game from the identified situation. The cloud service 10 may not execute processing of charging a user who has made a bookmark request when receiving the bookmark request, and may instead execute processing of charging a user who has made a request to execute the shooting game when receiving the shooting game execution request.

In this case, under the condition that the client 14 is playing a live video, the cloud service 10 may start, with the reception of the bookmark request as a trigger, the output of frame images by the replay video management unit 44 to the data storage unit 46 and the generation/output of return data by the return data generating unit 48.

To give yet still another example, when receiving a game return request from one of the clients 14, the return request receiving unit 52 may transmit to the client 14 a screen for checking whether or not to start the execution of a game. Until the return request receiving unit 52 receives from the client 14 a reply to the effect that the execution of the game is to be started, the play point identifying unit 54 may not identify a play point at which the replay video has been played at the time of click on the return link 30.

To give yet still another example, the cloud service 10 may provide the services that have been described above as ones provided by the video management system 12. The cloud service 10 may output key information received from one of the clients 14 to the data storage unit 46 as a key log in association with data indicating a time at which the key information has been received. The replay video management unit 44 may generate frame images that are included in a replay video based on the key log, and distribute by streaming to the client 14.

To give yet still another example, instead of judging images, the data storage unit 46 may store in advance memory image details or register values managed by the emulator 38 that are observed in emulation at the times when game stages end or at the time of game over. The game situation monitoring unit 50 may monitor the emulated memory images or register values which are managed by the emulator 38, and detect the time when a game stage ends or the time of game over based on the result of a comparison between the result of the monitoring and the above-mentioned data stored in the data storage unit 46.

To give yet still another example, when generating a replay video, the replay video management unit 44 may receive from the client 14 of the user A information that specifies a range of frame images from which the replay video is generated. The replay video management unit 44 then may generate a replay video that includes frame images in the specified range. The replay video management unit 44 may delete from the data storage unit 46 the return data 58 that corresponds to frame images outside the specified range.

To give yet still another example, a video ID may contain information indicating whether or not there is the return data 58. Under the condition that the client 14 of the user B receives the replay video display screen 28 from the video management system 12, the plug-in program for the cloud service 10 that is installed in the client 14 of the user B may determine whether or not there is the return data 58 that corresponds to the received replay video based on the video ID of the replay video. Under the condition that the plug-in program determines that there is the return data 58 that corresponds to the replay video, the plug-in program may embed the return link 30 in the replay video display screen 28.

Under the condition that the user B clicks on the return link 30 while a replay video is being played, thus causing the client 14 to transmit a game return request to the cloud service 10, the cloud service 10 may check whether or not there is the return data 58 that corresponds to this replay video. In the case where the return data 58 exists, the play point identifying unit 54 may identify a game that is being played and identify snapshot data as described above.

To give yet still another example, the user A may click on the return link 30 while viewing the replay video display screen 28 on which a replay video showing a play content that has been played by the user A himself/herself is being played. In this case, the client 14 of the user A transmits a game return request that is associated with this play point to the cloud service 10. The cloud service 10 starts the execution of the game from a situation that is associated with the game return request, and distributes by streaming a live video that shows the play content of this game to the client 14 of the user A. This way, under the condition that the user A viewing a replay video showing his/her own play content wishes to enjoy the game again, for example, the user A can enjoy the game started from a situation that corresponds to a play point specified by himself/herself.

To give yet still another example, game situation data may be data that indicates a parameter or a status in a game. A video ID may be attribute data associated with a replay video, instead of the above-mentioned metadata contained in a replay video. The functions implemented in the cloud service 10 may be implemented by a single server.

A game program does not need to be executed on the emulator 38 and may be executed on, for example, system software (an operating system or the like) of the cloud service 10 or the clients 14. In the case where the clients 14 are game devices, for example, under the condition that the user B clicks on the return link 30 while a replay video is being played, the client 14 of the user B may generate game situation data indicating the positions and directions of a group of objects that is associated with a combination of the video ID of a replay video being played and the frame ID of a frame image that has been displayed at the time when the replay video has been played. The client 14 which is a game device may start the execution of a game associated with the replay video from a situation indicated by the generated game situation data.

The video management system 12 may be a general server through which a business operator different from that of the cloud service 10 provides a video distribution service.

Further, the specific numerical values and character strings described above and the specific numerical values and character strings in the drawings are merely exemplary, and the present invention is not limited to those numerical values and character strings.

What is claimed is:

1. A method comprising:

displaying, with a user device, a replay video showing play content of a video game application;

transmitting, from the user device to a management server, during play of the replay video, a request for execution of the video game application with the user device, the request including a video identifier and a frame identifier for a frame image displayed at a time of the request;

receiving, with the user device from the management server, snapshot data of the video game application associated with elapsed time data identified based at least in part on the video identifier and the frame identifier; and executing the video game application with the user device from a play point indicated by the snapshot data.

2. The method of claim 1, wherein the method further comprises:

displaying a plurality of images, wherein each image corresponds to a respective frame image of a plurality of frame images of the replay video, and wherein each image operates as a respective hyperlink to launch the video game application from the respective frame image.

3. The method of claim 2, wherein the method further comprises:

determining an activation of a respective hyperlink, wherein the request comprises the video identifier and the frame identifier corresponding to the frame image associated with the hyperlink.

4. The method of claim 1, wherein the frame image displayed at the time of the request corresponds to a game state of the play content of the video game application.

5. The method of claim 1, wherein the video game application is a first instance of the video game application, and wherein the replay video corresponds to execution of a second instance of the video game application, and wherein execution of the second instance of the video game application is during execution of the first instance of the video game application.

6. The method of claim 1, wherein the video game application is executed by a local emulator.

7. The method of claim 1, wherein the video game application is received from a game server operating in a cloud computing environment.

8. The method of claim 1, wherein the elapsed time data indicates a time period from a start of a game stage to a time when the frame image having the frame identifier was displayed, and the snapshot data is associated with a shorter time period closest to the time period.

9. The method of claim 1, wherein the snapshot data includes memory image details or register values managed by an emulator that executes the video game application.

10. The method of claim 1, wherein the snapshot data is associated with a time closest to a time reached by going back a predetermined length of time from a time indicated by the frame image displayed at the time of the request.

11. A computing device comprising:

one or more processors; and one or more computer-readable media having stored thereon instructions that, when executed with the one or more processors, cause the computing device to:

display of a replay video showing play content of a video game application;

transmit, during play of the replay video, a request for execution of the video game application, the request including a video identifier and a frame identifier for a frame image displayed at a time of the request;

receive snapshot data associated with elapsed time data identified based at least in part on the video identifier and the frame identifier; and cause execution of the video game application from a play point indicated by the snapshot data.

12. The computing device of claim 11, wherein the instructions further cause the device to:

display a plurality of images, wherein each image corresponds to a respective frame image of a plurality of frame images of the replay video, and wherein each image operates as a respective hyperlink to launch the video game application from the respective frame image.

13. The computing device of claim 12, wherein the instructions further cause the device to:

determine an activation of a respective hyperlink, wherein the request comprises the video identifier and the frame identifier corresponding to the frame image associated with the hyperlink.

14. The computing device of claim 11, wherein the frame image displayed at the time of the request corresponds to a game state of the play content of the video game application.

15. One or more non-transitory, computer-readable media having thereon instructions that, when executed with one or more processors, cause a computer system to, at least:

display a replay video showing play content of a video game application;

transmit, during play of the replay video, a request for execution of the video game application, the request including a video identifier and a frame identifier for a frame image displayed at a time of the request;

receive snapshot data associated with elapsed time data identified based at least in part on the video identifier and the frame identifier; and execute the video game application from a play point indicated by the snapshot data.

16. The one or more non-transitory, computer-readable media of claim 15, wherein the instructions further cause the computer system to:

display a plurality of images, wherein each image corresponds to a respective frame image of a plurality of frame images of the replay video, and wherein each image operates as a respective hyperlink to launch the video game application from the respective frame image.

17. The one or more non-transitory, computer-readable media of claim 16, wherein the instructions further cause the computer system to:

determine an activation of a respective hyperlink, wherein the request comprises the video identifier and the frame identifier corresponding to the frame image associated with the hyperlink.

18. The one or more non-transitory, computer-readable media of claim 16, wherein the frame image displayed at the time of the request corresponds to a game state of the play content of the video game application.

19. The one or more non-transitory, computer-readable media of claim 16, wherein the video game application is a first instance of the video game application, and wherein the replay video corresponds to execution of a second instance of the video game application, and wherein execution of the second instance of the video game application is during execution of the first instance of the video game application.

20. The one or more non-transitory, computer-readable media of claim 16, wherein the video game application is executed by a local emulator.

* * * * *